United States Patent
Arata et al.

(10) Patent No.: US 10,179,525 B2
(45) Date of Patent: Jan. 15, 2019

(54) VEHICULAR SEAT

(71) Applicant: TACHI-S CO., LTD., Tokyo (JP)

(72) Inventors: Kazuyoshi Arata, Tokyo (JP); Takao Tsutsui, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/550,296

(22) PCT Filed: Feb. 9, 2016

(86) PCT No.: PCT/JP2016/053737
§ 371 (c)(1),
(2) Date: Aug. 10, 2017

(87) PCT Pub. No.: WO2016/129575
PCT Pub. Date: Aug. 18, 2016

(65) Prior Publication Data
US 2018/0022252 A1    Jan. 25, 2018

(30) Foreign Application Priority Data

Feb. 13, 2015  (JP) .................................. 2015-026417
Feb. 13, 2015  (JP) .................................. 2015-026427
Feb. 20, 2015  (JP) .................................. 2015-031757

(51) Int. Cl.
*B60N 2/56* (2006.01)
*B60N 2/58* (2006.01)

(52) U.S. Cl.
CPC ............. *B60N 2/5628* (2013.01); *B60N 2/56* (2013.01); *B60N 2/5642* (2013.01); *B60N 2/5657* (2013.01); *B60N 2/58* (2013.01)

(58) Field of Classification Search
CPC .. B60N 2/5628; B60N 2/5642; B60N 2/5657; B60N 2/58

(Continued)

(56) References Cited

U.S. PATENT DOCUMENTS 6,179,706 B1* 1/2001 Yoshinori ............ B60N 2/5635
                                                  297/180.14
6,481,801 B1* 11/2002 Schmale .............. B60N 2/5635
                                                  297/180.14 X (Continued)

FOREIGN PATENT DOCUMENTS

DE  102009024781 A1  12/2010
JP    H09-254642 A    9/1997

(Continued)

OTHER PUBLICATIONS

International Search Report for PCT/JP2016/053737 dated Apr. 26, 2016; English translation submitted herewith (5 pages).

(Continued)

*Primary Examiner* — Rodney B White
(74) *Attorney, Agent, or Firm* — Fitch, Even, Tabin & Flannery, LLP

(57) ABSTRACT

A vehicular seat having a seat cushion and a seat back, which are configured to be provided with air flow layers capable of being formed by a relatively simple step, is configured to be provided with: the seat cushion on which a vehicle occupant is seated; the seat back against which the vehicle occupant seated on the seat cushion rests his or her back; a fan disposed below the seat cushion; an air delivery duct for delivering to the seat cushion and the seat back, air delivered from the fan; and a seat cover for discharging the air delivered from the air delivery duct, from the surface of the seat cushion and the seat back to the side on which the vehicle occupant is seated. A plurality of groove spaces through which air delivered from the air delivery duct is caused to flow are formed inside the seat cover.

14 Claims, 9 Drawing Sheets

(58) Field of Classification Search
USPC .................................. 297/180.13, 180.14
See application file for complete search history.

(56) References Cited

U.S. PATENT DOCUMENTS

| | | | | |
|---|---|---|---|---|
| 6,685,553 | B2* | 2/2004 | Aoki | B60N 2/5635 297/180.14 |
| 6,848,742 | B1* | 2/2005 | Aoki | B60N 2/5635 297/180.14 |
| 7,191,480 | B2* | 3/2007 | Romano | A47C 27/122 297/180.14 |
| 7,644,983 | B2* | 1/2010 | Wolfe, IV | B60N 2/5614 297/180.13 X |
| 7,665,803 | B2* | 2/2010 | Wolas | A47C 7/744 297/180.13 X |
| 7,688,582 | B2* | 3/2010 | Fukazu | B60K 1/04 297/180.13 X |
| 7,931,330 | B2* | 4/2011 | Itou | B60N 2/5635 297/180.14 |
| 8,235,461 | B2* | 8/2012 | Cohen | A42B 3/124 297/180.13 X |
| 2002/0145312 | A1* | 10/2002 | Gielda | A47C 7/74 297/180.13 |
| 2003/0102699 | A1 | 6/2003 | Aoki et al. | |
| 2005/0188849 | A1* | 9/2005 | Yoneno | A47C 7/744 96/143 |
| 2006/0249995 | A1* | 11/2006 | Stoewe | A47C 7/74 297/180.14 |
| 2006/0290175 | A1 | 12/2006 | Hartwich | |
| 2007/0101729 | A1* | 5/2007 | Aoki | B60H 1/00285 62/3.61 |
| 2009/0295200 | A1* | 12/2009 | Ito | B60N 2/809 297/180.14 |
| 2009/0322124 | A1* | 12/2009 | Barkow | A47C 7/74 297/180.14 |
| 2010/0038937 | A1* | 2/2010 | Andersson | B60N 2/5635 297/180.14 |
| 2010/0295339 | A1 | 11/2010 | Siu | |
| 2011/0061400 | A1* | 3/2011 | Park | B60N 2/5657 62/3.2 |
| 2011/0187165 | A1 | 8/2011 | Oota et al. | |
| 2011/0260509 | A1* | 10/2011 | Siu | A47C 7/021 297/180.14 |
| 2012/0256451 | A1* | 10/2012 | Sahashi | B60N 2/5635 297/180.14 |
| 2013/0099550 | A1* | 4/2013 | Ota | B60N 2/5642 297/452.42 |
| 2013/0113265 | A1* | 5/2013 | Ota | B60N 2/5657 297/452.47 |
| 2013/0264742 | A1* | 10/2013 | Ota | B29D 99/0092 264/266 |
| 2014/0152058 | A1* | 6/2014 | Line | B60N 2/56 297/180.13 X |
| 2014/0346820 | A1* | 11/2014 | Brandt | B60N 2/5621 297/180.13 |
| 2015/0251580 | A1* | 9/2015 | Sachs | A61H 9/0078 297/180.13 |

FOREIGN PATENT DOCUMENTS

| | | |
|---|---|---|
| JP | H10-57201 A | 3/1998 |
| JP | 2000-125990 A | 5/2000 |
| JP | 2003-165325 A | 6/2003 |
| JP | 2006-524159 A | 10/2006 |
| JP | 2010-052494 A | 3/2010 |
| JP | 2011-156993 A | 8/2011 |
| JP | 2012-001134 A | 1/2012 |
| JP | 2014-094623 A | 5/2014 |

OTHER PUBLICATIONS

Office Action of JP Appln. No. 2015-026417 dated Aug. 7, 2018 with Machine English Translation from Global Dossier.
Office Action of JP Appln. No. 2015-026427 dated Aug. 7, 2018 with Machine English Translation from Global Dossier.
Office Action of JP Appln. No. 2015-031757 dated Aug. 7, 2018 with Machine English Translation from Global Dossier.

* cited by examiner

VEHICULAR SEAT

CROSS-REFERENCE TO RELATED APPLICATIONS

This application is a U.S. national phase application filed under 35 U.S.C. § 371 of International Application No. PCT/JP2016/053737, filed Feb. 9, 2016, designating the United States, which claims benefit of the filing dates of JP 2015-026417, filed Feb. 13, 2015, and JP 2015-026427, filed Feb. 13, 2015, and JP 2015-031757, filed Feb. 20, 2015, each of which is hereby incorporated herein by reference in its entirety.

TECHNICAL FIELD

The present invention relates to a vehicular seat, and more particularly, to a vehicular seat having a function of sending air to a seat cushion on which a vehicle occupant is seated and a seat back against which the seated vehicle occupant leans.

Further, the present invention relates to a vehicular seat for a vehicle such as a passenger car, and more particularly, to a vehicular seat having a ventilation function to sending air (wind) to the seat on which a vehicle occupant is seated.

BACKGROUND ART

A vehicular seat for a vehicle such as a passenger car has a seat cushion on which a vehicle occupant is seated and a seat back against which the seated vehicle occupant leans. As a structure having a function of sending wind from the vehicular seat to the side of the seated vehicle occupant, Patent literature 1 discloses a structure in which a ventilation layer to send wind from a blower via a duct to the inside of respective seat cover members of a seat cushion and a seat back is provided.

The ventilation layer described in the Patent literature 1 has a truss structure in which plural columnar parts are provided between a surface side mesh and a back side mesh. The surface side mesh is bonded to the back surface of the seat cover. The surface side mesh, the back side mesh, and the plural columnar parts are integrally connected with elastically deformable resin.

Further, in the vehicular seat, to maintain comfortability of the respective seat cushion on which the vehicle occupant is seated and the seat back against which the vehicle occupant seated on the seat cushion leans, means for sucking air from the surface of the seat and discharging the sucked air from another position of the seat is used.

As an example of this structure, Patent literature 2 describes a structure where a blower is attached to the back side of a seat back. In a status where the blower is rotated, air in the vicinity of the surface of the seat back is sucked via a sucking duct from a hole formed in the vicinity of the surface of the seat back. The sucked air is blown to the surface of the back seat from a hole formed at a central part via a blowing duct.

Further, in the vehicular seat, to maintain comfortability of the respective seat cushion on which the vehicle occupant is seated, and the seat back, against which the vehicle occupant seated on the seat cushion leans, means for sucking air from the surface of the seat and discharging the sucked air from another position of the seat is used.

As an example of this structure, Patent literature 3 describes a structure where an exhauster is attached to the lower side of the seat cushion, and the exhauster is operated to suck air in the vicinity of the surfaces of the seat cushion and the seat back from a hole formed in the seat cushion and the seat back in a position near a side surface of the surface side, and blow the sucked air to the outside from the exhauster.

CITATION LIST

Patent Literature

PTL 1: Japanese Patent Application Laid-Open No. 2012-1134
PTL 2: Japanese Patent Application Laid-Open No. 2010-52494
PTL 3: Japanese Patent Application Laid-Open No. 2014-94623

SUMMARY OF INVENTION

Technical Problem

In the structure described in the Patent literature 1, the wind is blown from the ventilation layer provided inside the respective seat cover members of the seat cushion and the seat back to the front side of the seat cover. However, in this structure, the ventilation layer is formed by integrally connecting the plural columnar parts, held between the surface side mesh and the back side mesh, and the surface side mesh, and the back side mesh. Although not clearly described in the Patent literature 1, it is conceivable that it requires a large number of steps to integrally form the ventilation layer having this structure.

Further, in the lower part of the seat back, a lumbar mechanism is provided to support the vehicle occupant's lumbar when the vehicle occupant seated on the seat cushion leans against the seat back. An upper part (upper side) on the back surface of the seat back has comparatively sufficient space, and it is possible to suck and blow air from the surface of the seat back by using the blower and the duct. However, in the lower part (lower side) of the back surface of the seat back, provided with the lumbar mechanism, the space is comparatively small, and it is difficult to set the duct there.

Accordingly, the sucking and blowing of air from the surface of the seat back using the blower and the duct, as described in the Patent literature 2, are limited to the upper side of the seat back. In the lower part of the seat back provided with the lumbar mechanism, it is impossible to suck and blow air from the front surface by using the duct.

Further, as a structure to suck air from a seat cushion and a seat back and to blow the sucked air to the outside, Patent literature 3 describes a structure where an intake device is installed in a lower part of the seat cushion and the intake device, the seat cushion and the seat back are connected with a duct.

The duct is connected, in communication with a ventilation groove having plural discharge air passages, formed in a pad of the seat back through to the front surface, to the seat back.

Under the seat cushion on which the vehicle occupant is seated, a drive mechanism to slide the seat back and forth, a drive mechanism for reclining of the seat back and the like are provided, and many mechanisms are incorporated in the comparatively small space. Accordingly, to provide the intake device and the duct connected to the intake device under the seat cushion, the arrangement including the other parts is complicated. The number of parts is increased, and it takes time and effort to assemble the parts, which increases the cost.

Further, the seat back is provided with a lumbar mechanism part to support the lumbar of the seated vehicle occupant. To provide the duct without interference with the lumbar mechanism part, it is necessary to contrive the shape of the duct.

Further, it is necessary to provide plural ducts for connection from the intake device respectively to the seat cushion and the seat back. This increases the number of parts, and prevents the reduction of assembling cost.

The present invention provides a vehicular seat, having a seat cushion and a seat back, with a ventilation layer, which is capable of solving the problems in the conventional techniques, and which can be formed through comparatively simple steps.

Further, the present invention is to solve the above-described problems in the conventional techniques, and to provide a vehicular seat which enables air sucking and blowing from a wide area of a seat back surface including a lower part of the seat back where a lumbar mechanism is installed.

Further, the present invention provides a vehicular seat which solves the above-described problems in the conventional techniques, and enables intake and discharge from the seat cushion and the seat back, with a small number of parts and with a comparatively simple structure.

Solution to Problem

To solve the above-described problems, the present invention provides a vehicular seat comprising: a seat cushion on which a vehicle occupant is seated; a seat back against which the vehicle occupant seated on the seat cushion leans; a fan provided in a lower part of the seat cushion; an air duct that sends air sent from the fan to the seat cushion and the seat back; and a seat cover that discharges the air sent from the air duct from surfaces of the seat cushion and the seat back to the side on which the vehicle occupant is seated. A plurality of groove spaces to pass the air sent from the air duct are formed inside the seat cover.

Further, to solve the above-described problems, the present invention provides a vehicular seat comprising: a seat cushion on which a vehicle occupant is seated; a seat back against which the vehicle occupant seated on the seat cushion leans; a fan that sends air; an air duct that sends the air sent from the fan to the seat cushion and the seat back; and a seat cover that discharges the air, passed through a plurality of groove space to pass the air sent from the air duct, from breathable surfaces of the seat cushion and the seat back, to the side where the vehicle occupant is seated.

Further, to solve the above-described problems, the present invention provides a vehicular seat comprising: a seat cushion on which a vehicle occupant is seated; and a seat back against which the vehicle occupant seated on the seat cushion leans. The seat back has: a breathable seat cover provided on a surface against which the vehicle occupant leans; a pad member, the surface of which is covered with the seat cover, and in which a plurality of ventilation holes are formed in vertical and lateral directions; a lumbar mechanism part to support the lumbar of the vehicle occupant seated on the seat cushion; a blower provided on the back surface side of the pad member; a duct connecting at least one of the plurality of ventilation holes provided in the pad member, in a position upper from the lumbar mechanism part, with the blower; and a cover, covering the blower, the duct, and the lumbar mechanism part, to form tightly closed space along with the back surface side of the pad member.

Further, to solve the above-described problems, the present invention provides a vehicular seat comprising: a seat cushion on which a vehicle occupant is seated; and a seat back against which the vehicle occupant seated on the seat cushion leans. The seat back has: a breathable seat cover provided on the surface against which the vehicle occupant leans; a pad member, the surface of which is covered with the seat cover, and in which a plurality of ventilation holes are formed; a blower provided on the back surface side of the pad member; and a duct connecting at least one hole among the plurality of ventilation holes provided in the pad member, in an upper part of the pad member. Air sucking or air blowing from the surface of the seat cover, through the ventilation hole connected with the duct formed in the upper part of the pad member, is performed using the duct connected with the blower. Further, air sucking or air blowing from the surface of the seat cover is performed through the ventilation hole formed in a lower part of the pad member, without using the duct.

Further, to solve the above-described problems, the present invention provides a vehicular seat comprising: a seat cushion on which a vehicle occupant is seated; a seat back against which the vehicle occupant seated on the seat cushion leans; and a duct connecting the seat cushion and the seat back. The seat back has: a breathable seat cover provided on the surface against which the vehicle occupant leans; a pad member the surface of which is covered with the seat cover, and in which a plurality of ventilation holes are formed; a lumbar mechanism part to support the lumbar of the vehicle occupant seated on the seat cushion; a blower provided on the back surface side of the pad member; and a cover, covering the blower and the lumbar mechanism part, to form tightly closed space along with the back surface side of the pad member. The seat cushion has: a breathable seat cover provided on the surface on which the vehicle occupant is seated; and a pad member the surface of which is covered with the seat cover, and in which a ventilation groove is formed. The duct connects the blower in the seat back and the groove formed in the seat cushion via the cover.

Further, to solve the above-described problems, the present invention provides a vehicular seat comprising: a seat cushion on which a vehicle occupant is seated; a seat back against which the vehicle occupant seated on the seat cushion leans; and a blower. The seat back has: a breathable seat cover provided on the surface against which the vehicle occupant leans; a pad member the surface of which is covered with the seat cover, and in which a plurality of ventilation holes are formed; a lumbar mechanism part to support the lumbar of the vehicle occupant seated on the seat cushion; and a cover covering the lumbar mechanism part, to form tightly closed space along with the back surface side of the pad member. The seat cushion has: a breathable seat cover provided on the surface on which the vehicle occupant is seated; and a pad member the surface of which is covered with the seat cover, and in which a ventilation groove is formed. The blower has a first duct connected with the groove of the pad member in the seat cushion and a second duct connected with the cover of the seat back.

Advantageous Effects of Invention

According to the present invention, it is possible to provide a vehicular seat, having a seat cushion and a seat back, with a ventilation layer which can be formed through comparatively simple steps.

Further, according to the present invention, it is possible to perform air sucking and blowing from a wide area of a seat back surface including a lower part of the seat back in which the lumbar mechanism is installed.

Further, according to the present invention, it is possible to provide a vehicular seat which enables intake and discharge from the seat cushion and the seat back, with a small number of parts and with a comparatively simple structure.

DESCRIPTION OF EMBODIMENTS

Hereinbelow, examples of the present invention will be described using the drawings.

Example 1

In the present example, a vehicular seat, where a skin layer of seat cushion and seat back in a vehicular seat for vehicle such as a passenger car is formed with a skin member, a soft intermediate layer member, and a backside member, will be described. In the intermediate layer, a ventilation passage is formed and a hole communicating with the skin member side is formed in the ventilation passage. Wind sent from a blower via the air duct is sent to the ventilation passage in the intermediate member. The air is discharged via the hole from the skin member side to the side on which the vehicle occupant is seated, from the surfaces of the seat cushion and the seat back.

Figure 1:
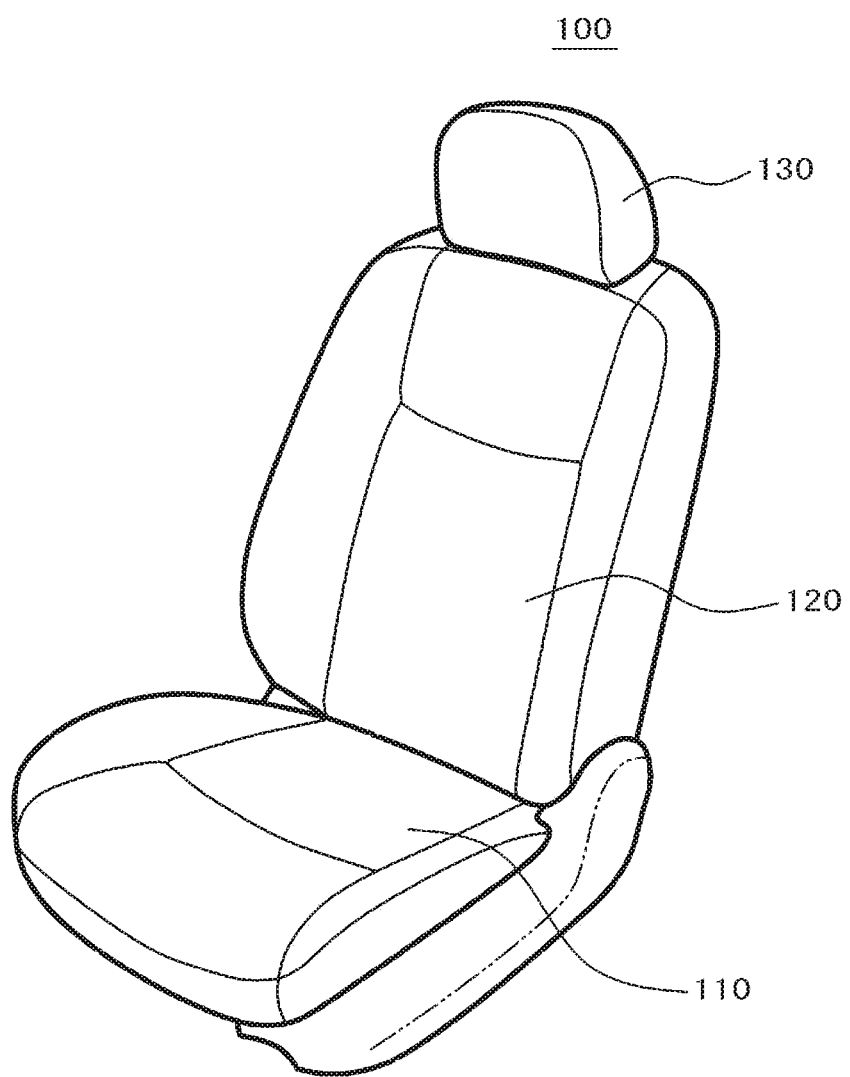
FIG. 1 is a perspective view showing a schematic structure of a vehicular seat according to the example 1 of the present invention.

FIG. 1 shows the outer appearance of a vehicular seat 100 as the subject of the present invention. The vehicular seat 100 has a seat cushion 110 on which a vehicle occupant (not shown) is seated, a seat back 120 against which the vehicle occupant seated on the seat cushion 110 leans, and a head rest 130 to support the vehicle occupant's head.

Figure 2:
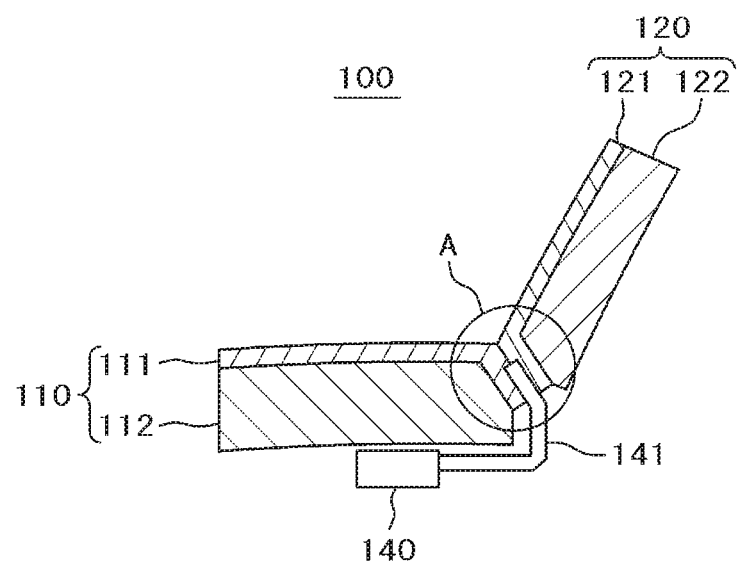
FIG. 2 is a cross sectional view showing the schematic structure of the vehicular seat according to the example 1 of the present invention.

FIG. 2 schematically shows a cross section of the vehicular seat 100. Reference numeral 111 denotes a seat cover of the seat cushion 110, and 112, a urethane pad member of the seat cushion 110. Further, numeral 121 denotes a seat cover of the seat back 120, and 122, a urethane pad member of the seat back 120. In FIG. 2, illustration of the head rest 130 and illustration of a frame member are omitted.

The vehicular seat 100 has a fan 140 as a blower and an air duct 141 under the seat cushion 110. The fan 140 sucks air in the vehicle under the seat cushion 110, and discharges the air to the air duct 141 side. The air (wind) sucked from the fan 140 and discharged to the air duct 141 side is sent from the surfaces of the seat covers 111 and 121 of the seat cushion 110 and the seat back 120 to the side where the vehicle occupant is seated.

Figure 3:
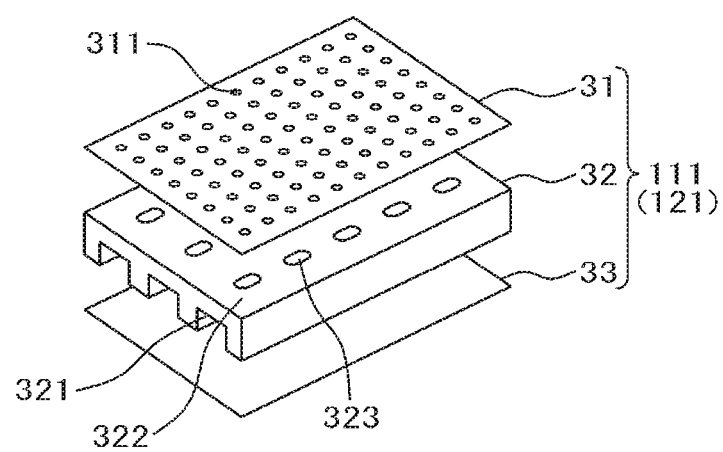
FIG. 3 is a perspective view showing a structure of a seat cover of the vehicular seat according to the example 1 of the present invention.

FIG. 3 shows the structure of the seat covers 111 and 121. The seat covers 111 and 121 have a seat-surface side skin member 31, an intermediate layer member 32, and a pad side member 33.

The seat-surface side skin member 31 is formed with breathable fabric or skin having breathability with a large number of holes 311. On the other hand, the pad side member 33 is formed with non-breathable material such as non-woven fabric or a resin seat.

In the intermediate layer member 32, formed with an elastic material such as urethane, plural recesses 321 are formed along the longitudinal direction of the seat cushion 110 and the vertical direction of the seat back 120. Further, holes 323 are formed in an upper surface 322 of the recess 321. It is possible to change the positions from which the air is sent from the surfaces of the seat covers 111 and 121 to the side where the vehicle occupant is seated by changing the positions of the holes 323.

Figure 4:
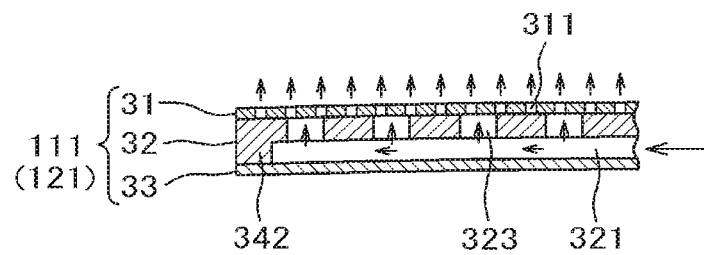
FIG. 4 is a cross sectional view showing the structure of the seat cover of the vehicular seat according to the example 1 of the present invention.

FIG. 4 shows a cross section of the seat covers 111 and 121. The arrow in the figure indicates the flow of the air sent from the fan 140 via the air duct 141. In the figure, the air sent from the right side direction flows along spaces (groove spaces) formed with the recesses 321 formed in the intermediate layer member 32 and the non-breathable pad side member 33. The recesses 321 are formed such that an end 324 of the intermediate layer member 32 is left. Accordingly, the air sent from the right side in the figure along the spaces formed with the recesses 321 and the pad side member 33 does not escape to the left side.

The air flew along the spaces formed with the recesses 321 and the pad side member 33 passes from the large number of holes 323 formed in the upper surface 322 of the recesses 321 in the intermediate layer member 32 through the breathable seat-surface side skin member 31, and flows from the seat-surface side skin member 31 to the outside where the vehicle occupant is seated.

In this manner, as the air sent from the fan 140 flows from the seat-surface side skin member 31 covering the surfaces of the seat cushion 110 and the seat back 120 to the outside where the vehicle occupant is seated, the seat cushion 110 and the seat back 120 breathe well, and provide comfortableness to the seated vehicle occupant.

Figure 5:
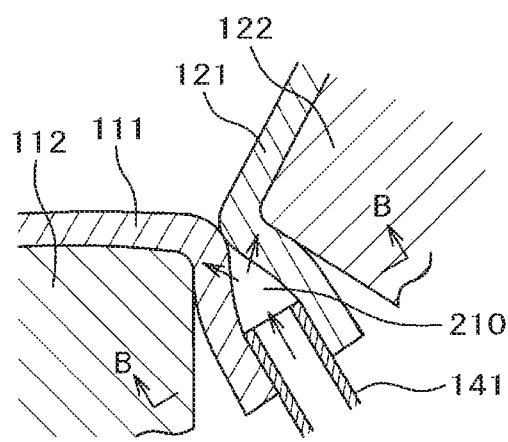
FIG. 5 is an enlarged view of a part A in FIG. 2 showing the relationship between the seat cover and an air duct in the vehicular seat according to the example 1 of the present invention.

FIG. 5 shows a part A in FIG. 2, i.e., an enlarged view of the structure of a connecting portion among the air duct 141, and the seat cover 111 on the seat cushion 110 side, and the seat cover 121 on the seat back 120 side. The part around the end of the air duct 141 is held between the seat cover 111 on the seat cushion 110 side and the seat cover 121 on the seat back 120 side.

In this structure, as indicated with the arrow, the air sent from the fan 140 is discharged from the end of the air duct 141 to space 210 held between the seat cover 111 on the seat cushion 110 side in the vicinity of the end of the air duct 141 and the seat cover 121 on the seat back 120 side in the vicinity of the end of the air duct 141. The air discharged to the space 210 passes from the breathable seat-surface side skin member 31 of the seat cover 111 and the seat cover 121 through the large number of holes 323 formed in the intermediate layer member 32 to the recess 321 side.

Since the recesses 321 are formed such that the end 324 of the intermediate layer member 32 is left, as described above, the air flew to the recess 321 side flows to the seat cushion 110 side or the seat back 120 side, along the spaces formed with the recesses 321 and the non-breathable pad side member 33 as described in FIG. 4, passes from the large number of holes 323 formed in the upper surface 322 of the recesses 321 in the intermediate layer member 32 through the breathable seat-surface side skin member 31, and flows from the seat-surface side skin member 31 to the outside where the vehicle occupant is seated.

Figure 6:
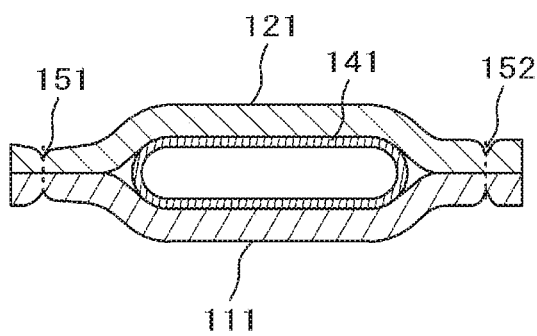
FIG. 6 is a cross sectional view along a line B-B in FIG. 5 showing the relationship between the seat cover and the air duct in the vehicular seat according to the example 1 of the present invention.

FIG. 6 shows a cross section along a line B-B in FIG. 5, i.e., a cross section of the connecting portion among the air duct 141, the seat cover 111 on the seat cushion 110 side, and the seat cover 121 on the seat back 120 side. The seat cover 111 on the seat cushion 110 side and the seat cover 121 on the seat back 120 side are sewn, with the air duct 141 between the seat covers, in positions 151 and 152 on the both sides. With this configuration, in the air discharged from the air duct 141 to the space 210, it is possible to reduce the amount of the air leaked to the outside from a gap among the air duct 141, the seat cover 111 and the seat cover 121, and to increase the amount of the air which flows to the side of the recesses 321 in the intermediate layer member 32.

Figure 7:
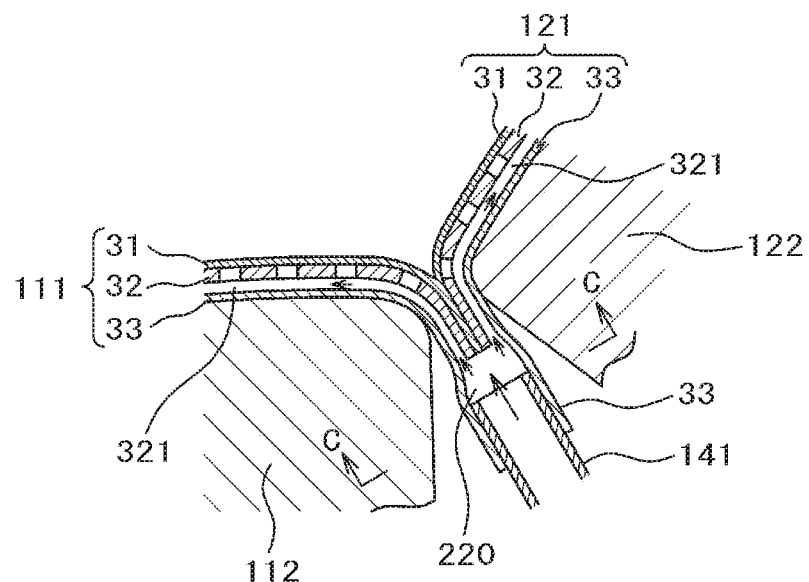
FIG. 7 is an enlarged view of the part A in FIG. 2 showing a modification of the relationship between the seat cover and the air duct in the vehicular seat according to the example 1 of the present invention.

FIG. 7 shows a modification of the structure of the connecting portion among the air duct 141, the seat cover 111 on the seat cushion 110 side and the seat cover 121 on the seat back 120 side.

Figure 8:
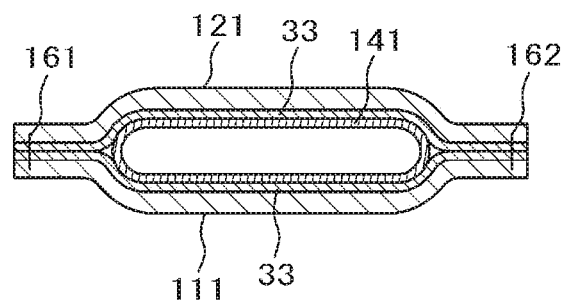
FIG. 8 is a cross sectional view along a line C-C in FIG. 7 showing another modification of the relationship between the seat cover and the air duct in the vehicular seat according to the example 1 of the present invention.

In the example shown in FIG. 7, the lengths of the seat-surface side skin member 31 and the intermediate layer member 32 of the seat cover 111 and the seat cover 121 are shorter than the non-breathable pad side member 33. The air duct 141 is held with the pad side members 33, and the pad side members 33 on the both sides of the air duct 141 are sewn in positions 161 and 162 on the both sides shown in FIG. 8 as in the case of FIG. 6. In this case, the recesses 321 in the intermediate layer member 32 are formed through the intermediate layer member 32. The end of the recesses 321 formed in the intermediate layer member 32 is opened in space 220 surrounded with the end of the air duct 141, the seat cover 111, and the seat cover 121.

In this structure, the air sent from the fan 140 is discharged from the end of the air duct 141 to the space 220. As indicated with the arrow, the air discharged to the space 220 flows from the opening of the recesses 321 in the end surface of the intermediate layer member 32 along the spaces formed with the recesses 321 and the non-breathable pad side member 33, to the seat cushion 110 side or the seat back 120 side. Then the air passes from the large number of holes 323 formed in the upper surface 322 of the recesses 321 in the intermediate layer member 32 through the breathable seat-surface side skin member 31, and flows from the seat-surface side skin member 31 to the outside where the vehicle occupant is seated.

It is possible to change the amount of air flow and its distribution by changing the size distribution, the number of holes 323, and interval (arrangement) of holes formed in the upper surface 322 of the recesses 321 in the intermediate layer member 32. For example, it is possible to set the amount of the air which flows from the seat back 120 side to a smaller amount with respect to the amount of the air which flows from the seat cushion 110 side by reducing the size and the number of the holes 323 formed in the intermediate layer member 32 on the seat back 120 side comparing to the seat cushion 110.

Further, even in the same plane of the seat cushion 110 or the seat back 120, it is possible to set the amount of the air which flows from the central part to a larger amount, or conversely, to a smaller amount, with respect to the peripheral part by adjusting the distribution of the size of the holes 323 and interval (arrangement) and the like of the holes 323 in the intermediate layer member 32.

According to the present example, the air, sent from the fan 140 and passed through the air duct 141 to the side of the seat cover 111 and the seat cover 121, flows along the spaces formed with the recesses 321 formed in the intermediate layer member 32 of the seat cover 111 and the seat cover 121 and the non-breathable pad side member 33. Accordingly, upon formation of the intermediate layer member 32, it is possible to form the recesses 321 at the same time, and it is possible to form air flow passages with a comparatively low cost.

Next, it is configured such that the back surface of the seat back has a closed structure, then in an upper part of the seat back, air sucking or air blowing from the surface is performed by using a duct, and in a lower part of the seat back, the air sucking or the air blowing from the seat back surface is performed without duct. With this configuration, a vehicular seat, in which even in the lower part of the seat back where a lumbar mechanism is installed, it is possible to perform air sucking or air blowing from the seat back surface, and it is possible to perform air sucking and air blowing in a comparatively wide region of the seat back surface or in an arbitrary position, will be described in examples from 2 to 4.

Example 2

Figure 9:
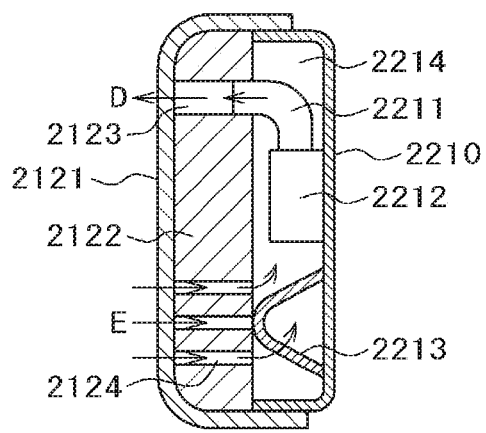
FIG. 9 is a cross sectional view showing a schematic structure of the seat back of the vehicular seat according to the example 2 of the present invention.

FIG. 9 schematically shows a cross section of the seat back 120-1 of the vehicular seat 100. Numeral 2121 denotes a breathable seat cover of the seat back 120-1. Numeral 2122 denotes a urethane pad member of the seat back 120-1. An air blowing hole 2123 is formed in the upper side of the pad member 2122, further, a large number of air sucking holes 2124 are formed in the lower side of the pad member 120-1.

In the structure shown in FIG. 9, for the sake of simplification of the explanation, illustration of mechanical parts is omitted.

On the back side of the seat back 120-1, an air duct 2211 the end of which is fitted in the air blowing hole 2123, a blower 2212, and a lumbar mechanism part 2213 as a part of a lumbar mechanism are provided. These members are tightly closed up with a back cover 2210. As the blower 2212, a sirocco fan is used. When the blower 2212 using this sirocco fan is operated, the air is sucked from the left side surface of the blower 2212 in FIG. 9. The sucked air is discharged to the side of the air duct 2211 attached to the upper surface of the blower 2212.

With this structure, when the blower 2212 is operated, the blower 2212 sucks the air in space 2214 closed with the back cover 2210 and sends the air to the air duct 2211 side. The air is sent from the air duct 2211 through the air blowing hole 2123, and as indicated with an arrow D, blown from the breathable seat cover 2121 to the surface side of the seat cover 2121.

The end of the air duct 2211 is tightly fitted in the air blowing hole 2123. Further, a portion of the air duct 2211 for connection with the blower 2212 is closely attached to the blower 2212 side. With this structure, respectively different pressure statuses are caused inside the air duct 2211 and the outside the air duct 2211, separated from the space 2214 inside the back cover 2210. In this status, the air sent from the blower 2212 to the air duct 2211 is blown through the air blowing hole 2123 to the surface side of the seat cover 2121, without returning into the space 2214 closed with the back cover 2210.

On the other hand, in the space 2214 closed with the back cover 2210 in which the air has sucked, the air pressure is lower than the atmospheric pressure. As indicated with an arrow E, the air is sucked from the large number of air sucking holes 2124 formed in the lower side of the pad member 2120 via the breathable seat cover 2121.

In this manner, as the air duct 2211 is used in the space 2214 closed with the back cover 2210, it is possible, by operating the blower 2212, to blow the air from the air duct 2211 through the air blowing hole 2123 to the surface side of the seat cover 2121, and at the same time, to suck the air from the large number of air sucking holes 2124 formed on the lower side of the pad member 2122 via the breathable seat cover 2121 into the inside the space 2214 closed with the back cover 2210, efficiently, and in a stable manner.

Figure 10:
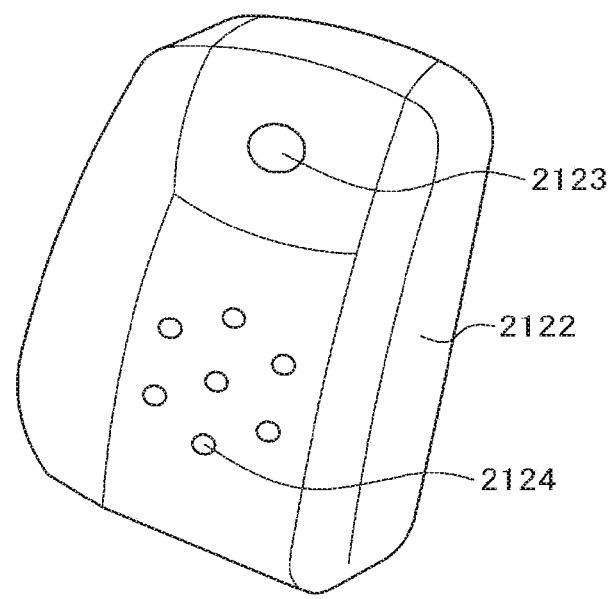
FIG. 10 is a perspective view showing a schematic structure of a pad member of the seat back in the vehicular seat according to the example 2 of the present invention.

FIG. 10 shows a perspective view of the pad member 2212. In the upper part of the pad member 2122, the air blowing hole 2123 is formed, and in the lower part, the large number of air sucking holes 2124 are formed. The air blowing hole 2123 and the air sucking holes 2124 are formed through the pad member 2122.

Note that in the example shown in FIG. 10, only one air blowing hole 2123 is formed. However, plural air blowing holes 2123 may be provided. In this case, the end of the air duct 2211 are branched in correspondence with the number of air blowing holes 2123 formed in the pad member 2122, and the respective ends are tightly fitted in the air blowing holes 2123.

Further, in the example shown in FIG. 10, the plural air sucking holes 2124 are provided in the lower part of the pad member 2122. Further, the air sucking hole 2124 may be provided in the vicinity of the air blowing hole 2123 or in the central part of the pad member 2122. Further, the air sucking holes 2124 may be provided in the entire surface of the pad member 2122.

In this manner, by separating the air sent with the blower 2212 from the air sucked in the blower 2212 by using the air duct 2211, it is unnecessary to provide a duct on the air sucking side of the blower 2212. It is possible to provide the air sucking holes 2124 in the lower part of the seat back 120 in which the lumbar mechanism part 2213 is installed.

With this configuration, it is possible to provide the air blowing hole 2123 and the air sucking holes 2124 in arbitrary positions with respect to the seat back 120. It is possible to prevent confinement of heat around the lumbar of the vehicle occupant and to efficiently perform dehumidification.

Example 3

In the example 2, the example using the air duct 2211 has been described. In the present example, an example using an air sucking duct will be described using FIG. 11.

Figure 11:
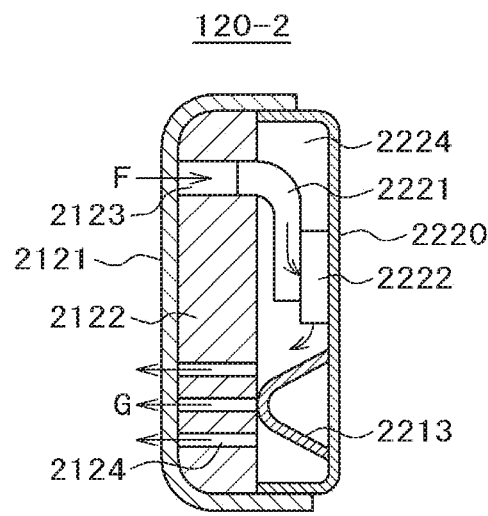
FIG. 11 is a cross sectional view showing a schematic structure of the seat back in the vehicular seat according to the example 3 of the present invention.

FIG. 11 shows a cross section of the seat back 120-2 according to the present example. In the structure shown in FIG. 11, the constituent elements the same as those described in the example 2 have the same numerals. The difference from the example 2 is the structure of the back side of the seat back 120-2. In the example 2, the hole 2123 has been described as an air blowing hole. In the example 3, it is an air sucking hole. Further, the large number of holes 2124 has been described as air sucking holes. In the example 3, they are described as air blowing holes.

In the structure shown in FIG. 11, on the back side of the seat back 120-2, there are an air sucking duct 2221 with its end fitted in the air sucking hole 2123, a blower 2222, and a lumbar mechanism part 2213. They are provided inside space 2224 tightly closed with the back cover 2220. The air sucking duct 2221 is closely connected to the air sucking side of the blower 2222. The air discharging side of the blower 2222 is opened to the space 2224 tightly closed with the back cover 2220. As the blower 2222, a sirocco fan is used as in the case of the example 2.

In this structure, when the blower 2222 is operated, air is sucked with the blower 2222, from the air sucking duct 2221 through the air sucking hole 2123 via the breathable seat cover 2121, from the surface side of the seat cover 2121, as indicated with an arrow F. The sucked air is discharged from the blower 2222 into the space 2224 tightly closed with the back cover 2220. In the space 2224 tightly closed with the back cover 2220, into which the air has been discharged from the blower 2222, the air pressure is higher than the atmospheric pressure. The air is blown, from the air blowing holes 2124 via the breathable seat cover 2121, to the surface side of the seat cover 2121.

The end of the air sucking duct 2221 is tightly fitted in the air sucking hole 2123. With this configuration, the air, discharged from the blower 2222 into the space 2224 tightly closed with the back cover 2220, is passed through the air blowing holes 2124, without returning to the air sucking duct 2221 side, and is blown to the surface side of the seat cover 2121 as indicated with an arrow G.

In this manner, as the air sucking duct 2211 is used in the space 2214 closed with the back cover 2210, it is possible to suck air from the air sucking duct 2221 through the air sucking hole 2123, from the surface side of the seat cover 2121, by operating the blower 2222, and at the same time to blow the air in the space 2224 closed with the back cover 2210 from the large number of air blowing holes 2124 via the breathable seat cover 2121, to the surface side of the seat cover 2121, efficiently, and in a stable manner.

The arrangement of the holes 2123 and 2124 formed in the pad member 2122 in the present example is the same as that described in the example 2 using FIG. 10, and the difference is operation of air blowing or air sucking. Accordingly, the explanation of the arrangement will be omitted.

According to the present example, it is possible to provide the air blowing holes 2124 and the air sucking hole 2123 in arbitrary positions with respect to the seat back 120-2. It is possible to prevent confinement of heat around the lumbar of the vehicle occupant and to perform dehumidification efficiently.

Example 4

In the example 2, an example using the air duct 2211 has been described, and in the example 3, an example using the air sucking duct 2221 has been described. In the present example, an example where one duct is used as an air duct and an air sucking duct will be described.

Figure 12:
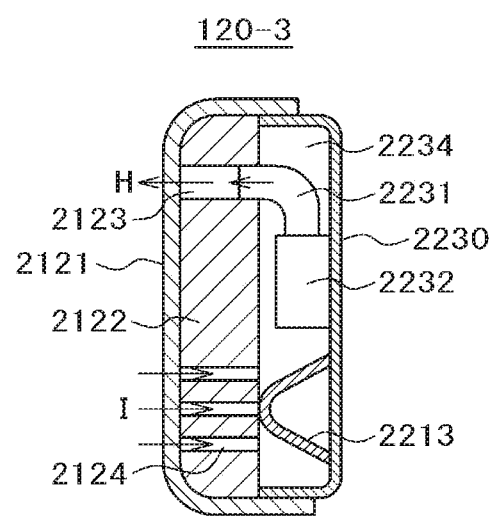
FIG. 12 is a cross sectional view showing a schematic structure of the seat back in the vehicular seat according the example 4 of the present invention.

FIG. 12 shows a cross sectional view of the seat back 120-3 according to the present example. In the structure shown in FIG. 12, the constituent elements the same as those described in the example 2 have the same numerals. The difference from the example 2 is the structure of the back side of the seat back 120-3. In the example 2, the hole 2123 has been described as an air blowing hole. In the example 4, it is an air blowing hole and an air sucking hole. Further, in the example 2, the large number of holes 2124 has been described as air sucking holes. In the example 4, they are used as air blowing holes and air sucking holes.

In the structure shown in FIG. 12, on the back side of the seat back 120-3, there are an air sucking and air blowing duct 2231 with its end fitted in the hole 2123 used as an air sucking hole and an air sucking hole, a blower 2232, and a lumbar mechanism part 2213. They are provided in space 2234 tightly closed with the back cover 2230. The duct 2231 is connected to one side of the blower 2232. The other side of the blower 2232 is opened to the space 2234 tightly closed with the back cover 2230. In the example 2 and the example 3, the example using the sirocco fan as the blower 2212 or 2222 has been described. In the present example, an axial flow fan is used.

The blower 2232 using the axial flow fan changes the rotational direction of the fan by changing the electric polarity, which changes air flow direction.

That is, by forward-rotating the axial flow fan of the blower 2232, as in the case described in the example 2, the air in the space 2234 tightly closed with the back cover 2230 is sucked with the blower 2232, and the sucked air is blown from the blower 2232 to the duct 2231 side. The air blown to the duct 2231 side is passed through the hole 2123, and blown via the breathable seat cover 2121, from the surface side of the seat cover 2121, as indicated with an arrow H.

The end of the duct 2231 is tightly fitted in the hole 2123. With this configuration, the air sent from the blower 2232 to the duct 2231 is blown through the hole 2123, without returning to the space 2234 closed with the back cover 2230, to the surface side of the seat cover 2121, as indicated with the arrow H.

On the other hand, in the space 2234 closed with the back cover 2230 in which the air has been sucked, the air pressure is lower than the atmospheric pressure. The air is sucked from the large number of holes 2124 formed in the lower part of the pad member 2122, via the breathable seat cover 2121, as indicated with an arrow I.

Further, by reverse-rotating the axial flow fan of the blower 2232, the air on the duct 2231 side is sucked with the blower 2232, as in the case described in the example 3. The sucked air is blown into the space 2234 tightly closed with the back cover 2230 on the opposite side to the duct 2231. That is, by reverse-rotating the axial flow fan of the blower 2232, the air is sucked from the duct 2231 through the hole 2123, from the surface side of the seat cover 2121, and at the same time, the air in the space 2234 closed with the back cover 2230 is blown from the large number of holes 2124 to the surface side of the breathable seat cover 2121 in the opposite direction to the direction of the arrow I.

In this manner, by using the axial flow fan as the blower 2232, it is possible to change the direction to send the air from the blower 2232 by changing the polarity of electric pressure applied to the blower 2232. This enables selection between an air sucking position and an air blowing position on the surface of the seat back.

Next, the vehicular seat, in which the back surface of the seat back has a closed structure, the blower and the cushion seat are connected with a duct, air sucking or air blowing from the surface of the seat cushion is performed via the duct, and air sucking or air blowing from the surface of the seat back is performed without duct, capable of air sucking or air blowing from the both surfaces on the seat cushion side and the seat back side, by using one blower and one duct, will be described in the examples 5 to 8.

Further, in the following examples, it makes possible to perform air sucking from the surface of the seat cushion and air blowing from the surface of the seat back, or on the contrary, to perform air blowing from the surface of the seat cushion and air sucking from the surface of the seat back, simultaneously, using one blower and one duct.

Example 5

Figure 13:
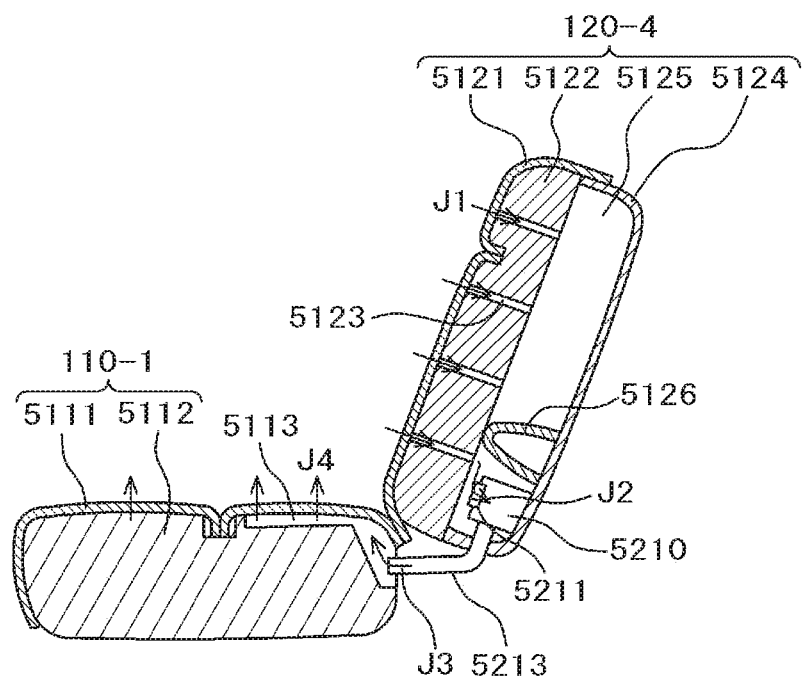
FIG. 13 is a cross sectional view showing a schematic structure of the vehicular seat according to the example 5 of the present invention.

FIG. 13 schematically shows a cross section of the seat cushion 110-1 and the seat back 120-4 in the vehicular seat 100 according to the present example. In FIG. 13, for the sake of simplification of the explanation, illustration of the head rest 130 and illustration of mechanical parts of the seat cushion 110-1 and the seat back 120-4 are omitted.

The seat cushion 110-1 has a breathable seat cover 5111 and a urethane pad member 5112. An air blowing or air sucking groove 5113 is formed in the pad member 5112. The groove 5113 becomes an air passage upon air blowing to the surface of the seat cushion 110-1 or air sucking via the breathable seat cover 5111 covering the surface.

The seat back 120-4 has a breathable seat cover 5121 and a urethane pad member 5122. Air blowing or air sucking holes 5123 are formed in the pad member 5122.

Aback cover 5124 is attached to the back side of the seat back 120-4, and space 5125 surrounded with the pad member 5122 and the back cover 5124 is tightly closed. A lumbar mechanism part 5126 as a part of the lumbar mechanism, a blower 5210, and a duct 5213 connected to the discharge side of the blower 5210 are installed in the tightly closed space 5125. As the blower 5210, a sirocco fan is used. An intake 5211 of the blower 5210 is opened to the side of the tightly closed space 5125. Actually, various mechanism parts are installed in this tightly closed space 5125. However, in FIG. 13, for the sake of simplification of the explanation, illustration of these parts is omitted.

The duct 5211 connected to the blower 5210 extends through the back cover 5124 to the outside, and its end extends into the groove 5113 formed in the pad member 5112 on the seat cushion 110-1 side, and is fixed with an unillustrated means.

In this structure, when the blower 5210 is operated, the blower 5210 sucks the air from the intake 5211, as indicated with an arrow J2, into the space 5125 closed with the back cover 5124, to send the air to the side of the duct 5213 connected to the discharge side. The air sent to the duct 5213 enters the groove 5113 of the seat cushion 110-1, as indicated with an arrow J3. The air entered the groove 5113 is blown from the breathable seat cover 5111 to the surface side of the seat cover 5111, as indicated with an arrow J4.

On the other hand, in the space 5125 closed with the back cover 5124 in which the air is sucked with the blower 5210, the air pressure is lower than the atmospheric pressure. As a result, the air is sucked from the large number of holes 5123 formed in the pad member 5122 via the breathable seat cover 5121 of the seat back 120-4, as indicated with an arrow J1.

In this manner, by sucking air from the seat cover 5121 side of the seat back 120-4 into the space 5125 closed with the back cover 5124, then sending the air through the duct 5213 to the seat cushion 110-1 side, and injecting the air from the seat cover 5111 of the seat cushion 110-1, it is possible to perform air sucking with the seat back 120-4 and at the same time to perform air blowing with the seat cushion 110-1, using only one blower 5210 and one duct 5213.

Note that in the structure shown in FIG. 13, in the tightly closed space 5125 on the back of the seat back 120-4, the blower 5210 is provided in a position lower than the lumbar mechanism part 5126, however, the blower 5210 may be provided in an upper position from the lumbar mechanism part 5126.

Figure 14:
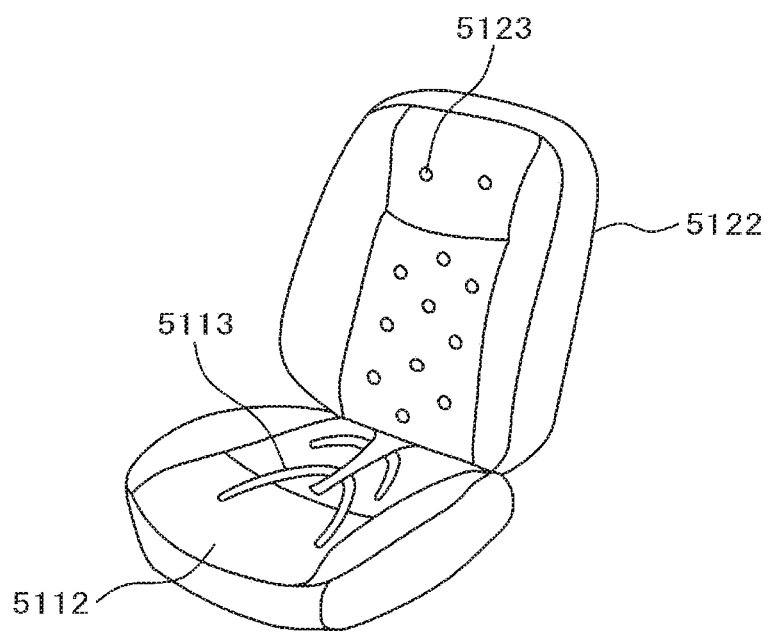
FIG. 14 is a perspective view showing a schematic structure of the pad member in the vehicular seat according to the example 5 of the present invention.

FIG. 14 shows a perspective view of the pad member 5112 on the seat cushion 110-1 side and the pad member 5122 on the seat back 120-4 side. An air blowing groove 5113 is formed in the pad member 5112 on the seat cushion 110-1 side. Further, a large number of air sucking holes 5123 are formed in the pad member 5122 on the seat back 120-4 side. The air sucking holes 5123 are formed through the pad member 5122.

As described above, according to the present example, as the back surface of the seat back 120-4 provided with the lumbar mechanism part 5126 and the blower 5210 is tightly closed, a duct to suck air from the surface of the seat back 120-4 is unnecessary. It is possible to simultaneously perform air sucking in the seat back 120-4 and air blowing in the seat cushion 110-1, with a more simple structure using one blower 5210 and one duct 5213.

Example 6

As an example 6 of the present invention, an opposite case to the example 5, i.e., a structure to suck air from the seat cushion 110-1 side and blow the air from the seat back 120-4 side, will be described using FIG. 15. In the structure shown in FIG. 15, the constituent elements the same as those described in the example 5 using FIG. 13 have the same numerals, and explanations of those elements will be omitted to avoid overlapping of explanation. In the structure shown in FIG. 15, the difference from the structure described in FIG. 13 is that a duct 5214 is attached to the intake 5211 side of the blower 5210. As the blower 5210, as in the case of the example 5, a sirocco fan is used.

Figure 15:
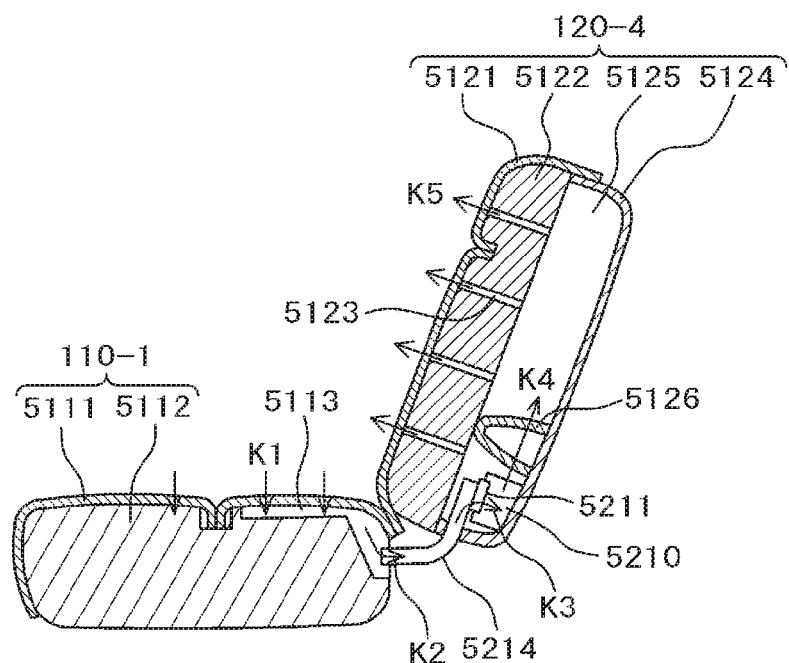
FIG. 15 is a cross sectional view showing a schematic structure of the vehicular seat according to the example 6 of the present invention.

In the structure shown in FIG. 15, when the blower 5210 is operated, the blower 5210 sucks the air on the surface side of the seat cover 5111 from the breathable seat cover 5111 via the duct 5214 connected to the intake 5211 and the groove 5113 of the seat cushion 110-1, as indicated with an arrow K1.

The air sucked from the surface side of the seat cover 5111 passes through the duct 5214 as indicated with an arrow K2, then is sucked from the intake 5211 into the blower 5210 as indicated with an arrow K3, and is discharged into the space 5125 closed with the back cover 5124 as indicated with an arrow K4.

In the space 5125 closed with the back cover 5124 in which the air has been discharged with the blower 5210, the air pressure is higher than the atmospheric pressure. As a result, the air is blown from the large number of holes 5123 formed in the pad member 5122 via the breathable seat cover 5121 of the seat back 120-4, to the outside of the seat back 120-4, as indicated with an arrow K5.

In this manner, by discharging the air, sucked from the seat cushion 110-1 side, via the duct 5214, into the space 5125 closed with the back cover 5124, and blowing the air from the seat back 120-4 side, it is possible to simultaneously perform air sucking in the seat cushion 110-1 and air blowing in the seat back 120-4 only using one blower 5210 and one duct 5214.

Note that in the present example, the groove 5113 formed in the pad member 5112 on the seat cushion 110-1 side and the hole 5123 formed in the pad member 5122 on the seat back 120-4 side are the same as those described in the example 5 using FIG. 14.

As described above, according to the present example, the back surface of the seat back 120-4 provided with the lumbar mechanism part 5126 and the blower 5210 is tightly closed. Accordingly, a duct to blow air from the surface of the seat back 120-4 is unnecessary. It is possible to simultaneously perform air sucking in the seat cushion 110-1 and air blowing in the seat back 120-4 with a more simple structure using one blower 5210 and one duct 5214.

Example 7

In the example 5, the example where air blowing in the seat cushion 110-1 and air sucking in the seat back 120-4 are simultaneously performed has been described. In the example 6, the example where air sucking in the seat cushion 110-1 and air blowing in the seat back 120-4 are simultaneously performed has been described. In the present example, an example where simultaneous air blowing in the seat cushion 110-1 and air sucking in the seat back 120-4 or simultaneous air sucking in the seat cushion 110-1 and air blowing in the seat back 120-4 is selected by selecting the rotational direction of the blower will be described using FIG. 16.

Figure 16:
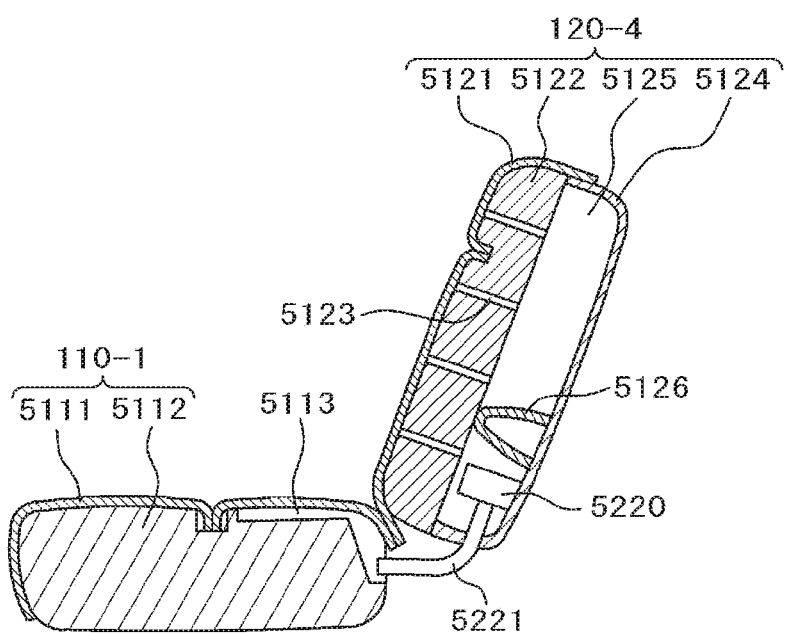
FIG. 16 is a cross sectional view showing a schematic structure of the vehicular seat according to the example 7 of the present invention.

In the structure shown in FIG. 16, the constituent elements the same as those described in the example 5 and the example 6 have the same numerals. The blower 5220 is different from that in the examples 5 and 6. That is, in the examples 5 and 6, the sirocco fan is used as the blower 5210. In the present example, an axial flow fan is used as the blower 5220. When the axial flow fan is used as the blower, it is possible to change the rotational direction of the axial flow fan (reverse rotation) by selecting the polarity of voltage applied to the axial flow fan. This reverses air flow direction.

In the structure shown in FIG. 16, as in the case described in the example 5, air sucking from the seat back 120-4 and air blowing from the seat cushion 110-1 are performed by forward-rotating the axial flow fan of the blower 5220.

On the other hand, as in the case described in the example 6, air sucking from the seat cushion 110-1 and air blowing from the seat back 120-4 are performed by reverse-rotating the axial flow fan of the blower 5220.

Note that in the present example, the groove 5113 formed in the pad member 5112 on the seat cushion 110-1 side and the hole 5123 formed in the pad member 5122 on the seat back 120-4 are the same as those described in the example 5 using FIG. 14.

In this manner, as the axial flow fan is used as the blower 5220, it is possible to change the direction of air blowing from the blower 5220 by selecting the polarity of voltage applied to the blower 5220. With this configuration, it is possible to select air sucking or air blowing in the surfaces of the seat cushion 110-1 and the seat back 120-4 in the same structure.

Example 8

In the examples 5 to 7, the structure where the blower is provided on the seat back 120-4 side has been described. In the present example, an example where the blower is installed on the seat cushion 110-1 side will be described.

Figure 17:
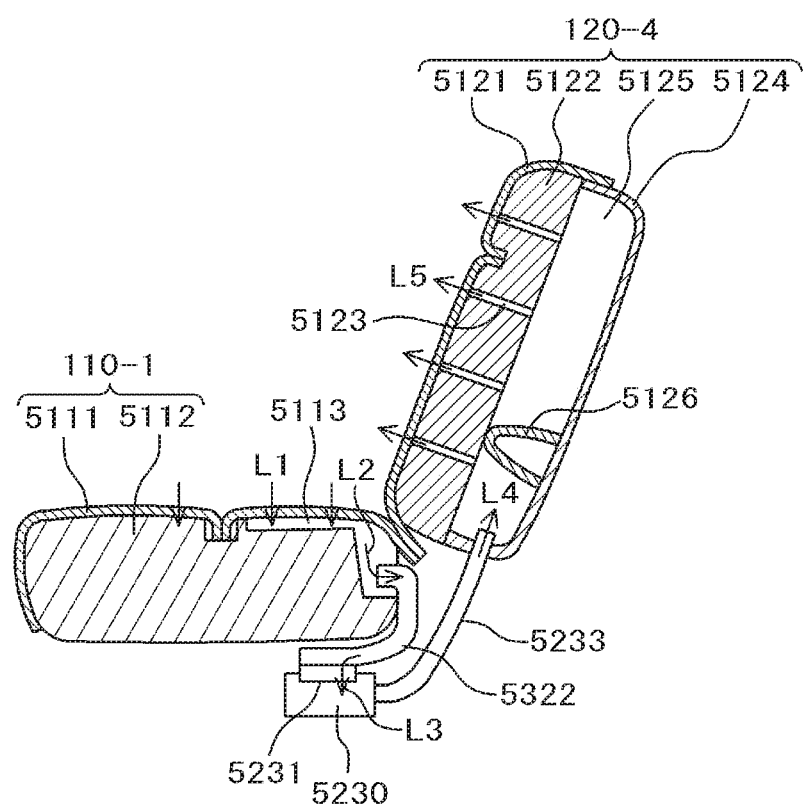
FIG. 17 is a cross sectional view showing a schematic structure of the vehicular seat according to the example 8 of the present invention.

FIG. 17 shows the structure of the vehicular seat in the present example. In the present example, a blower 5230 is installed under the seat cushion 110-1, an intake 5231 of the blower 5230 and a groove 5113 of the seat cushion 110-1 are connected with a duct 5322. And space 5125, surrounded with a pad member 5122 of the seat back 120-4 and the back cover 5124, and the discharge side of the blower 5230 are connected with a duct 5233. Note that as the blower 5230, a sirocco fan is used.

In this structure, when the blower 5230 is operated, as in the case of the example 6, it sucks air on the surface side of the seat cover 5111 from the breathable seat cover 5111 via the duct 5322 connected to the intake 5231 and the groove 5113 of the seat cushion 110-1, as indicated with an arrow L1.

The air sucked from the surface side of the seat cover 5111 passes through the duct 5322 as indicated with an arrow L2, then is sucked from the intake 5231 into the blower 5230 as indicated with an arrow L3, and is discharged in the space 5125 closed with the back cover 5124 as indicated with an arrow L4.

In the space 5125 closed with the back cover 5124, in which the air has been discharged with the blower 5230, the air pressure is higher than the atmospheric pressure. As a result, the air is blown to the outside of the seat back 120-4 from the large number of holes 5123 formed in the pad member 5122, via the breathable seat cover 5121 of the seat back 120-4, as indicated with an arrow L5.

In this manner, the air sucked from the seat cushion 110-1 side via the duct 5322 is blown via the duct 5233 in the space 5125 closed with back cover 5124, and is blown from the seat back 120-4 side. It is possible to simultaneously perform air sucking in the seat cushion 110-1 and air blowing in the seat back 120-4 with only one blower 5230.

Note that in the present example, the groove 5133 formed in the pad member 5122 on the seat cushion 110-1 side and the hole 5123 formed in the pad member 5122 on the seat back 120-4 side are the same as those described in the example 5 using FIG. 14.

As described above, according to the present example, as the duct is attached in the tightly closed space on the back of the seat back 120-4 and is connected to the blower 5230 installed under the seat cushion 110-1, a duct to blow the air from the surface of the seat back 120-4 is unnecessary. It is possible to simultaneously perform air sucking in the seat cushion 110-1 and air blowing in the seat back 120-4 with a more simple structure using one blower 5230.

Note that in the structure shown in FIG. 17, by changing the attachment positions of the ducts 5322 and 5233 to the blower 5230, as in the case described in the example 5, it is possible to suck air from the seat cover 5121 side of the seat back 120-4 into the space 5125 closed with the back cover 5124, then send the air through the duct 5233 to the blower 5230, then send the air from the blower 5230 via the duct 5322 to the seat cushion 110-1 side, and inject the air from the seat cover 5111 of the seat cushion 110-1.

Further, as the blower 5230, by using an axial flow fan in place of the sirocco fan as in the case of the example 7, it is possible to change the direction of air sending from the blower 5230 by selecting the polarity of voltage applied to the blower 5230, and to select air sucking or air blowing in the surfaces of the seat cushion 110-1 and the seat back 120-4 in the same structure.

As described above, the invention made by the present inventor has been concretely described based on the examples. The present invention is not limited to the above-described examples, but it goes without saying that various changes can be made without departing from its subject matter.

REFERENCE SIGNS LIST

100 . . . vehicular seat 110, 110-1 . . . seat cushion 111, 121 . . . seat cover 112, 122 . . . pad member 120, 120-1, 120-2, 120-3, 120-4 . . . seat back 140 . . . fan 141 . . . air duct 31 . . . seat-surface side skin member 32 . . . intermediate layer member 33 . . . pad side member 321 . . . recess 323 . . . hole 2121 . . . seat cover 2122 . . . pad member 2123, 2124 . . . hole 2210, 2220, 2230 . . . back cover 2211, 2221, 2231 . . . duct 2212, 222, 2232 . . . blower 2213 . . . lumbar mechanism part 5111, 5122 . . . pad member 5113 . . . groove 5124 . . . back cover 5126 . . . lumbar mechanism part 5210, 5220, 5230 . . . blower 5213, 5214, 5221, 5232, 5233 . . . duct.

The invention claimed is:

1. The vehicular seat comprising:
    a seat cushion on which a vehicle occupant is seated;
    a seat back against which the vehicle occupant seated on the seat cushion leans;
    a fan provided in a lower part of the seat cushion;
    an air duct that sends air sent from the fan to the seat cushion and the seat back; and
    a seat cover that discharges the air sent from the air duct from surfaces of the seat cushion and the seat back to the side on which the vehicle occupant is seated,
    wherein a plurality of groove spaces to pass the air sent from the air duct are formed inside the seat cover, and
    wherein the seat cushion and the seat back respectively have a structure where a surface of a pad is covered with the seat cover, and the seat cover has: a breathable seat-surface side skin member; a pad-side non-breathable member, and an intermediate layer member held between the seat-surface side skin member and the pad-side non-breathable member, and wherein the grooves formed in the intermediate layer member and the pad-side non-breathable member form the plurality of groove spaces to pass the air sent from the air duct.

2. The vehicular seat according to claim 1, wherein a plurality of openings, communicating with the side of the breathable seat-surface side skin member are formed in the grooves formed in the intermediate layer member.

3. The vehicular seat according to claim 2, wherein the plurality of openings, communicating with the side of the seat-surface side skin member, are non-uniformly provided on the intermediate layer member, or have non-uniformly formed opening diameters.

4. The vehicular seat comprising:
a seat cushion on which a vehicle occupant is seated;
a seat back against which the vehicle occupant seated on the seat cushion leans;
a fan that sends air;
an air duct that sends the air sent from the fan to the seat cushion and the seat back; and
a seat cover that discharges the air, passed through a plurality of groove space to pass the air sent from the air duct, from breathable surfaces of the seat cushion and the seat back, to the side where the vehicle occupant is seated,
wherein the seat cushion and the seat back respectively have a structure where a surface of a pad is covered with the seat cover, and wherein the seat cover has: a breathable seat-surface side skin member; a pad-side non-breathable member; and an intermediate layer member held between the seat-surface side skin member and the pad-side non-breathable member, further wherein the plurality of groove spaces to pass the air sent from the air duct are formed with grooves formed in the intermediate layer member and the pad-side non-breathable member.

5. The vehicular seat according to claim 4, wherein a plurality of openings, communicating with the side of the breathable seat-surface side skin member, are formed in the grooves formed in the intermediate layer member.

6. The vehicular seat according to claim 5, wherein the plurality of openings, communicating with the side of the seat-surface side skin member, formed in the grooves of the intermediate layer member, are unevenly provided on the intermediate layer member, or have non-uniformly formed opening diameters.

7. A vehicular seat comprising:
a seat cushion on which a vehicle occupant is seated;
a seat back against which the vehicle occupant seated on the seat cushion leans, and
a blower,
wherein the seat back has:
a first breathable seat cover provided on a surface against which the vehicle occupant leans; and
a pad member, the surface of which is covered with the first breathable seat cover, and in which a plurality of ventilation holes are formed in vertical and lateral directions;
a lumbar mechanism part to support the lumbar of the vehicle occupant seated on the seat cushion; and
a cover, covering the lumbar mechanism part, to form tightly closed space along with the back surface side of the pad member,
wherein the seat cushion has:
a second breathable seat cover provided on a surface on which the vehicle occupant sits; and
a pad member, the surface of which is covered with the second seat cover, and in which a ventilation recession is formed; and
wherein the blower has:
a first duct connecting an intake of the blower and the ventilation recession provided in the pad member of the seat cushion, and
a second duct connecting a discharge side of the blower and the cover of the seat back.

8. The vehicular seat according to claim 7, wherein, the blower is installed under the seat cushion.

9. The vehicular seat according to claim 7, wherein, a sirocco fan is used as the blower.

10. The vehicular seat according to claim 7, wherein an axial flow fan is used as the blower.

11. The vehicular seat comprising:
a seat cushion on which a vehicle occupant is seated;
a seat back against which the vehicle occupant seated on the seat cushion leans, and
a blower,
wherein the seat back has:
a first breathable seat cover provided on a surface against which the vehicle occupant leans; and
a pad member, the surface of which is covered with the first breathable seat cover, and in which a plurality of ventilation holes are formed in vertical and lateral directions;
a lumbar mechanism part to support the lumbar of the vehicle occupant seated on the seat cushion; and
a cover, covering the lumbar mechanism part, to form tightly closed space along with the back surface side of the pad member,
wherein the seat cushion has:
a second breathable seat cover provided on a surface on which the vehicle occupant sits; and
a pad member, the surface of which is covered with the second seat cover, and in which a ventilation recession is formed; and
wherein the blower has:
a first duct connecting a discharge side of the blower and the ventilation recession provided in the pad member of the seat cushion, and
a second duct connecting an intake of the blower and the cover of the seat back.

12. The vehicular seat according to claim 11, wherein, the blower is installed under the seat cushion.

13. A vehicular seat according to claim 11, wherein a sirocco fan is used as the blower.

14. The vehicular seat according to claim 1, wherein an axial flow fan is used as the blower.

* * * * *